US011450151B2

(12) United States Patent
Mossoba et al.

(10) Patent No.: US 11,450,151 B2
(45) Date of Patent: Sep. 20, 2022

(54) DETECTING ATTEMPTS TO DEFEAT FACIAL RECOGNITION

(71) Applicant: Capital One Services, LLC, McLean, VA (US)

(72) Inventors: Michael Mossoba, Arlington, VA (US); Joshua Edwards, Philadelphia, PA (US); Abdelkadar M'Hamed Benkreira, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 436 days.

(21) Appl. No.: 16/516,117

(22) Filed: Jul. 18, 2019

(65) Prior Publication Data
US 2021/0019539 A1   Jan. 21, 2021

(51) Int. Cl.
  *G06F 21/32*    (2013.01)
  *G06V 40/40*    (2022.01)
  (Continued)

(52) U.S. Cl.
  CPC .............. *G06V 40/40* (2022.01); *G06F 21/32* (2013.01); *G06F 21/45* (2013.01); *G06V 40/172* (2022.01)

(58) Field of Classification Search
  CPC ............ G06K 9/00899; G06K 9/00288; G06F 21/32; G06F 21/45; G06V 40/40; G06V 40/172
  (Continued)

(56) References Cited

U.S. PATENT DOCUMENTS 6,411,933 B1 * 6/2002 Maes ................. G06K 9/00892
                                                        704/273
7,508,960 B1 * 3/2009 Bolle ....................... A61B 3/14
                                                        382/117
(Continued)

FOREIGN PATENT DOCUMENTS

JP       10315906 A  * 12/1998   ....... B60R 21/01534
JP     2016103786 A  *  6/2016
KR    20050061975 A  *  6/2005

OTHER PUBLICATIONS

Ramachandra, Raghavendra, and Christoph Busch. "Presentation attack detection methods for face recognition systems: A comprehensive survey." ACM Computing Surveys (CSUR) 50, No. 1 (2017): 8. (Year: 2017).*

(Continued)

*Primary Examiner* — Luu T Pham
*Assistant Examiner* — Walter J Malinowski
(74) *Attorney, Agent, or Firm* — Harrity & Harrity, LLP

(57) ABSTRACT

A device may select an individual that is a candidate for authentication by facial recognition. The device may identify a facial area of the individual and an area of exposed skin of the individual. The device may obtain a first temperature associated with the facial area of the individual and a second temperature associated with the area of exposed skin of the individual. The device may determine, based on the first temperature and the second temperature, whether an appearance of the facial area of the individual is likely altered by a face-altering technology. The device may selectively perform facial recognition on the facial area of the individual based on whether the appearance of the facial area of the individual is likely altered by the face-altering technology.

20 Claims, 7 Drawing Sheets

(51) Int. Cl.
*G06F 21/45* (2013.01)
*G06V 40/16* (2022.01)

(58) Field of Classification Search
USPC .......................................................... 726/18
See application file for complete search history.

(56) References Cited

U.S. PATENT DOCUMENTS

| | | | |
|---|---|---|---|
| 7,809,163 B2 | 10/2010 | Sheu | |
| 8,984,622 B1* | 3/2015 | Baldwin | G06F 21/32 726/16 |
| 9,251,427 B1* | 2/2016 | Chu | G06K 9/00221 |
| 9,566,411 B1* | 2/2017 | Sherpa | G06F 16/436 |
| 9,619,723 B1* | 4/2017 | Chow | G06K 9/00288 |
| 9,740,083 B1* | 8/2017 | Hennings | H04N 5/2354 |
| 10,158,646 B1* | 12/2018 | Desai | H04L 63/102 |
| 10,200,364 B1* | 2/2019 | Ketharaju | H04L 63/0861 |
| 10,255,738 B1* | 4/2019 | Fernandez | G07C 9/37 |
| 2002/0109580 A1* | 8/2002 | Shreve | G07C 9/00103 340/5.61 |
| 2003/0129964 A1* | 7/2003 | Kohinata | H04M 1/67 455/411 |
| 2004/0230488 A1* | 11/2004 | Beenau | G06K 9/00 705/18 |
| 2006/0208169 A1* | 9/2006 | Breed | B60N 2/002 250/221 |
| 2007/0274572 A1* | 11/2007 | Nishino | A61B 5/015 382/118 |
| 2008/0008225 A1* | 1/2008 | Ahmad | G01W 1/17 374/109 |
| 2008/0192980 A1* | 8/2008 | Park | G06K 9/00221 382/103 |
| 2008/0252412 A1* | 10/2008 | Larsson | B60R 25/25 340/5.2 |
| 2009/0251278 A1* | 10/2009 | Sheu | G06K 9/00234 340/5.2 |
| 2011/0224509 A1* | 9/2011 | Fish | G06F 21/32 600/301 |
| 2012/0130251 A1* | 5/2012 | Huff | A61B 5/015 600/473 |
| 2012/0146903 A1* | 6/2012 | Arihara | G06K 9/209 345/158 |
| 2013/0088422 A1* | 4/2013 | Niikura | G06F 3/017 345/156 |
| 2013/0147845 A1* | 6/2013 | Xie | G06F 3/14 345/660 |
| 2013/0325981 A1* | 12/2013 | Hauke | H04L 51/04 709/206 |
| 2013/0342703 A1* | 12/2013 | Lin | G06K 9/00892 348/164 |
| 2014/0037156 A1* | 2/2014 | Cavallini | G06K 9/629 382/118 |
| 2014/0142403 A1* | 5/2014 | Brumback | A61B 5/02433 600/324 |
| 2014/0148705 A1* | 5/2014 | Linne | A61B 5/01 600/474 |
| 2014/0307929 A1* | 10/2014 | Nechyba | G06K 9/00228 382/118 |
| 2014/0323836 A1* | 10/2014 | Kusukame | A61B 5/00 600/344 |
| 2015/0069245 A1* | 3/2015 | Nagahisa | G01V 8/10 250/340 |
| 2015/0116079 A1* | 4/2015 | Mishra | H04W 12/06 340/5.52 |
| 2015/0135310 A1* | 5/2015 | Lee | A61B 5/681 726/20 |
| 2015/0182114 A1* | 7/2015 | Wang | A61B 90/96 600/549 |
| 2015/0294579 A1* | 10/2015 | Rudolph | G09B 7/00 434/353 |
| 2015/0363585 A1* | 12/2015 | Gooding | G06K 9/0002 726/19 |
| 2016/0012217 A1* | 1/2016 | Wolf | G06F 21/83 726/18 |
| 2016/0057623 A1* | 2/2016 | Dutt | H04W 12/06 455/411 |
| 2016/0063235 A1* | 3/2016 | Tussy | H04W 12/06 726/6 |
| 2016/0066034 A1* | 3/2016 | Hicks | H05K 999/99 725/12 |
| 2016/0098550 A1* | 4/2016 | Lam | G06F 21/32 726/18 |
| 2016/0100764 A1* | 4/2016 | Teich | H04N 7/188 348/77 |
| 2016/0110833 A1* | 4/2016 | Fix | G06Q 50/265 705/324 |
| 2016/0140405 A1* | 5/2016 | Graumann | G06K 9/00281 382/118 |
| 2016/0171192 A1* | 6/2016 | Holz | G06F 21/6245 726/19 |
| 2016/0171198 A1* | 6/2016 | John Archibald | G06F 21/32 726/19 |
| 2016/0275518 A1* | 9/2016 | Bowles | G06K 9/00087 |
| 2016/0299602 A1* | 10/2016 | Shuster | H04L 67/10 |
| 2017/0004699 A1* | 1/2017 | Rizvi | G08B 21/245 |
| 2017/0077764 A1* | 3/2017 | Bell | G06K 9/18 |
| 2017/0095157 A1* | 4/2017 | Tzvieli | A61B 5/08 |
| 2017/0111337 A1* | 4/2017 | Saboori | H04L 63/06 |
| 2017/0124385 A1* | 5/2017 | Ganong | G06K 9/00677 |
| 2017/0142589 A1* | 5/2017 | Park | H04W 12/08 |
| 2017/0156673 A1* | 6/2017 | Uchida | A61B 5/6893 |
| 2017/0180348 A1* | 6/2017 | Piccolotto | G06K 9/00906 |
| 2017/0357877 A1* | 12/2017 | Lin | G06K 9/00228 |
| 2018/0007553 A1* | 1/2018 | Dutt | G06F 1/1694 |
| 2018/0060680 A1* | 3/2018 | Alon | G06K 9/00906 |
| 2018/0239977 A1* | 8/2018 | Matsimanis | G06K 9/52 |
| 2018/0239979 A1* | 8/2018 | Ohno | A61B 5/1171 |
| 2018/0268554 A1* | 9/2018 | Roth | G06T 7/20 |
| 2018/0271379 A1* | 9/2018 | Watanabe | A61B 5/01 |
| 2018/0332035 A1* | 11/2018 | Finn | H04L 63/0861 |
| 2018/0336398 A1* | 11/2018 | Shenoy | G06F 1/3206 |
| 2018/0357470 A1* | 12/2018 | Yang | G06K 9/00255 |
| 2019/0014999 A1* | 1/2019 | Yuen | G06K 9/00906 |
| 2019/0050618 A1* | 2/2019 | Khuri-Yakub | A61B 5/02438 |
| 2019/0052661 A1* | 2/2019 | Anand | H04L 63/1433 |
| 2019/0058918 A1* | 2/2019 | Itzkowitz | H04N 21/4223 |
| 2019/0114496 A1* | 4/2019 | Lesso | G10L 25/51 |
| 2019/0117125 A1* | 4/2019 | Zhang | A61B 5/1495 |
| 2019/0130171 A1* | 5/2019 | Alameh | G01B 11/22 |
| 2019/0138795 A1* | 5/2019 | Vaidya | G06K 9/00288 |
| 2019/0147676 A1* | 5/2019 | Madzhunkov | H04N 7/186 340/5.2 |
| 2019/0207932 A1* | 7/2019 | Bud | G06F 21/32 |
| 2019/0209052 A1* | 7/2019 | Jeanne | A61B 5/0064 |
| 2019/0220652 A1* | 7/2019 | Li | G06F 21/32 |
| 2019/0222571 A1* | 7/2019 | Fausak | G06F 13/385 |
| 2019/0222756 A1* | 7/2019 | Moloney | G06F 16/164 |
| 2019/0231707 A1* | 8/2019 | Stiles | A61B 5/117 |
| 2019/0268575 A1* | 8/2019 | Leow | H04N 7/185 |
| 2019/0371028 A1* | 12/2019 | Harrises | G02B 27/0101 |
| 2020/0089851 A1* | 3/2020 | Kumar Agrawal | H04L 9/3226 |

OTHER PUBLICATIONS

Chingovska, Ivana, Nesli Erdogmus, André Anjos, and Sébastien Marcel. "Face recognition systems under spoofing attacks." In Face Recognition Across the Imaging Spectrum, pp. 165-194. Springer, Cham, 2016. (Year: 2016).*

Kose, Neslihan, and Jean-Luc Dugelay. "Countermeasure for the protection of face recognition systems against mask attacks." In 2013 10th IEEE International Conference and Workshops on Automatic Face and Gesture Recognition (FG), pp. 1-6. IEEE, 2013 (Year: 2013).*

Nalinakshi, B. G., Sanjeevakumar M. Hatture, Manjunath S. Gabasavalgi, and Rashmi P. Karchi. "Liveness detection technique for prevention of spoof attack in face recognition system." International Journal of Emerging Technology and Advanced Engineering 3, No. 12 (2013): 627-633. (Year: 2013).*

(56) References Cited

OTHER PUBLICATIONS

Delac, Kresimir, Mislav Grgic, and Marian Stewart Bartlett. Recent advances in face recognition. 2008. (Year: 2008).*
Devikar, P., "Face Liveness and Disguise Detection using Raspberry Pi and OpenCV", IJIRCCE, vol. 5, issue 1, Jan. 2017 (Year :2017).*
Nixon, Kristin Adair, Valerio Aimale, and Robert K. Rowe. "Spoof detection schemes." In Handbook of biometrics, pp. 403-423. Springer, Boston, MA, 2008. (Year: 2008).*
Parthasaradhi, Sujan TV. "Comparison of classification methods for perspiration-based liveness algorithm." (2003). (Year: 2003).*
Li, Lei, Paulo Lobato Correia, and Abdenour Hadid. "Face recognition under spoofing attacks: countermeasures and research directions." IET Biometrics 7, No. 1 (2017): 3-14. (Year: 2017).*
Shen, Meng, Zelin Liao, Liehuang Zhu, Rashid Mijumbi, Xiaojiang Du, and Jiankun Hu. "IriTrack: Liveness Detection Using Irises Tracking for Preventing Face Spoofing Attacks." arXiv preprint arXiv:1810.03323 (2018). (Year: 2018).*
Peter G. Neumann and Contributors, "Risks to the Public", ACM SIGSOFT Software Engineering Notes, May 2010, vol. 35, No. 3, pp. 24-32. (Year: 2010).*
Gundimada, Satyanadh, and Vijayan K. Asari. "Facial recognition using multisensor images based on localized kernel eigen spaces." IEEE Transactions on Image Processing 18, No. 6 (2009): 1314-1325. (Year: 2009).*
Ukai, Daisuke, and Kazuhito Murakami. "An identification method using thermo-image." In The 19th Korea-Japan Joint Workshop on Frontiers of Computer Vision, pp. 155-158. IEEE, 2013. (Year: 2013).*

* cited by examiner

US 11,450,151 B2

DETECTING ATTEMPTS TO DEFEAT FACIAL RECOGNITION

BACKGROUND

A facial recognition technique may identify an individual that is depicted in an image or a video frame. For example, the facial recognition technique may select one or more facial features of a face depicted in the image or the video frame, and compare the selected facial features to faces in a database. The database may include a mapping of the faces to identities, thereby permitting identification of the individual that is depicted in the image or the video frame.

SUMMARY

According to some implementations, a method may include selecting, by a device, an individual that is a candidate for authentication by facial recognition; identifying, by the device and based on selecting the individual, a facial area of the individual and an area of exposed skin of the individual, wherein the area of exposed skin of the individual is not associated with the facial area of the individual; obtaining, by the device, a first temperature associated with the facial area of the individual and a second temperature associated with the area of exposed skin of the individual; determining, by the device and based on the first temperature and the second temperature, whether an appearance of the facial area of the individual is likely altered by a face-altering technology, wherein the first temperature corresponding to the second temperature indicates that the appearance of the facial area of the individual is likely not altered by the face-altering technology, wherein the first temperature not corresponding to the second temperature indicates that the appearance of the facial area of the individual is likely altered by the face-altering technology; and selectively performing, by the device, facial recognition on the facial area of the individual based on whether the appearance of the facial area of the individual is likely altered by the face-altering technology.

According to some implementations, a device may include one or more memories and one or more processors, communicatively coupled to the one or more memories, to select an individual that is a candidate for authentication by facial recognition; obtain a temperature associated with a facial area of the individual; determine an estimated temperature for the facial area of the individual, wherein the estimated temperature is based on conditions of an environment associated with the individual; determine, based on the temperature and the estimated temperature, whether an appearance of the facial area of the individual is likely altered by a face-altering technology, wherein the temperature corresponding to the estimated temperature indicates that the appearance of the facial area of the individual is likely not altered by the face-altering technology, wherein the temperature not corresponding to the estimated temperature indicates that the appearance of the facial area of the individual is likely altered by the face-altering technology; and selectively perform facial recognition on the facial area of the individual based on whether the appearance of the facial area of the individual is likely altered by the face-altering technology.

According to some implementations, a non-transitory computer-readable medium may store one or more instructions that, when executed by one or more processors of, may cause the one or more processors to select an individual that is a candidate for authentication by facial recognition; identify, based on selecting the individual, a facial area of the individual and an area of exposed skin of the individual, wherein the area of exposed skin of the individual is not associated with the facial area of the individual; obtain a first temperature associated with the facial area of the individual and a second temperature associated with the area of exposed skin of the individual; determine an estimated temperature for the facial area of the individual, wherein the estimated temperature is based on conditions of an environment associated with the individual; determine, based on the first temperature, the second temperature, and the estimated temperature, whether an appearance of the facial area of the individual is likely altered by a face-altering technology, wherein the first temperature corresponding to the second temperature or the estimated temperature indicates that the appearance of the facial area of the individual is likely not altered by the face-altering technology, wherein the first temperature not corresponding to the second temperature and the estimated temperature indicates that the appearance of the facial area of the individual is likely altered by the face-altering technology; and selectively perform facial recognition on the facial area of the individual based on whether the appearance of the facial area of the individual is likely altered by the face-altering technology.

DETAILED DESCRIPTION

Figure 1A:
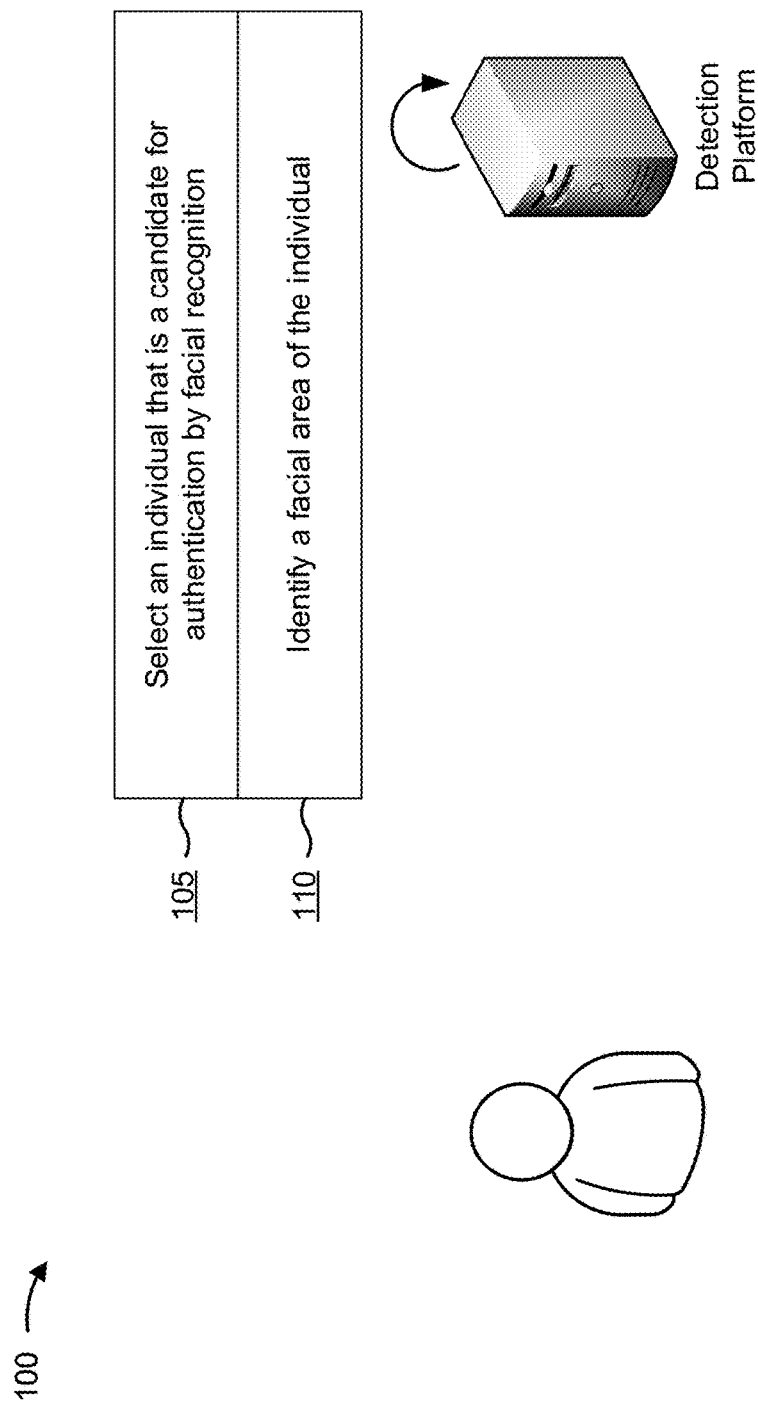
FIGS. 1A and 1B are diagrams of one or more example implementations described herein.

The following detailed description of example implementations refers to the accompanying drawings. The same reference numbers in different drawings may identify the same or similar elements.

Facial recognition may be performed to authenticate an identity of an individual, determine an identity of an individual of interest (e.g., an individual suspected of committing a crime), identify an individual of interest (e.g., identify an individual from a crowd), and/or the like. In one example, a financial institution may perform facial recognition on an individual when the individual is attempting to access an account. In particular, the financial institution may perform the facial recognition in order to authenticate an identity of the individual before permitting the individual to access the account.

Sometimes, an individual may attempt to defeat facial recognition by altering an appearance of the individual's face. For example, the individual may wear a mask (e.g., a mask of another individual's face) or a facial prosthetic (e.g., a prosthetic nose) in an attempt to defeat facial recognition. Masks and facial prosthetics have reached a level of sophistication that makes detection of a mask or a facial prosthetic difficult and technically complex. As a result, a facial recognition system may misidentify, or fail to identify, the individual that is attempting to defeat facial recognition. Thus, the facial recognition system may waste resources (e.g., processor resources, memory resources, and/or the like) performing facial recognition on facial features of the individual that are falsified or intentionally obscured. In addition, misidentification of the individual may permit the individual to engage in illegal activity, such as fraudulently accessing a financial account that belongs to another individual. In such a case, a financial institution that maintains the financial account may consume resources (e.g., computing resources and/or network resources) involved in identifying, investigating, and/or correcting the illegal activity.

Some implementations described herein provide a detection platform that may detect an attempt to defeat facial recognition using a face-altering technology (e.g., a mask, a facial prosthetic, and/or the like). The detection platform may identify a facial area of an individual that is a candidate for authentication by facial recognition, and may identify a characteristic of the facial area. For example, the characteristic may be a temperature of the facial area, a level of perspiration of the facial area, a depth of an eye recess of the facial area, and/or the like. Based on the characteristic, the detection platform may determine whether an appearance of the facial area is likely altered, and may selectively perform facial recognition on the individual based on whether the appearance of the facial area is likely altered. For example, the detection platform may not perform facial recognition on the individual based on determining that the appearance of the facial area is likely altered.

In this way, the detection platform conserves computing resources involved in facial recognition that would otherwise be wasted if facial recognition was performed on individuals using a face-altering technology (e.g., because facial recognition is unlikely to accurately identify such individuals). Moreover, the detection platform can reduce instances of misidentification caused by face-altering technology (e.g., masks), thereby conserving computing resources involved in identifying, investigating, and/or correcting illegal activity that may otherwise be permitted by misidentification.

Figure 1B:
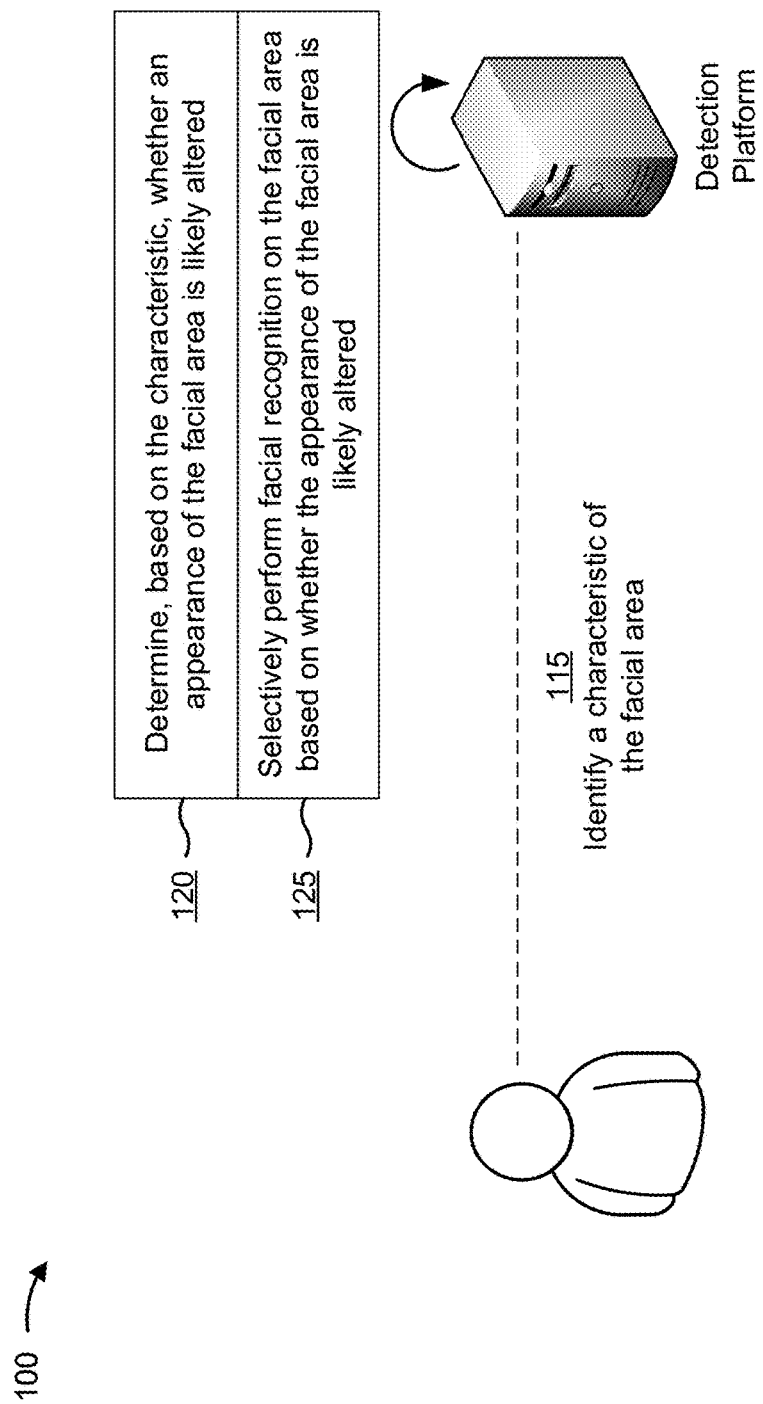

FIGS. 1A and 1B are diagrams of one or more example implementations 100 described herein. As shown in FIGS. 1A and 1B, example implementation(s) 100 may include a detection platform. The detection platform may be associated with an entity that performs facial recognition, such as a financial institution, a government agency (e.g., a police department, a transportation security agency, and/or the like), a school, a stadium, and/or the like. In some implementations, the detection platform may be associated with a financial institution that performs facial recognition in order to authenticate an individual to access a secure area. The secure area may be an account maintained by the financial institution that may be accessed via a transaction device, such as an automated teller machine (ATM) device.

The detection platform may be associated with one or more cameras and/or one or more sensors. The one or more cameras may be configured to capture an image or a video of an individual. The one or more sensors may be configured to detect and report one or more measurable parameters of the individual. For example, the one or more sensors may detect a temperature associated with the individual, a level of moisture associated with the individual, and/or the like. In some implementations, the detection platform may include the one or more cameras and/or the one or more sensors. Additionally, or alternatively, another device that is accessible to the detection platform may include the one or more cameras and/or the one or more sensors. For example, a transaction device (e.g., an ATM device) that is in communication with the detection platform may include the one or more cameras and/or the one or more sensors, and may provide data obtained by the one or more cameras and/or the one or more sensors to the detection platform.

The detection platform may implement a facial recognition system. The facial recognition system may utilize a facial recognition technique to identify a face of an individual. For example, the facial recognition technique may identify facial features (e.g., eyes, nose, mouth, jaw, cheekbones, and/or the like) of the individual from an image of the individual's face, and may determine a data set that represents a relative position, size, and/or shape of the facial features. The data set may be compared to other data sets representing facial features of known individuals in order to identify the individual. The data sets representing facial features of known individuals may be stored in a data structure (e.g., a data repository, a database, a table, a list, and/or the like) of the detection platform or accessible to the detection platform.

As shown in FIG. 1A, and by reference number 105, the detection platform may select an individual that is a candidate for authentication by facial recognition. In some cases, the individual may be utilizing a face-altering technology, such as a mask (e.g., a latex mask), a facial prosthetic, a bandage, an eye patch, and/or the like.

In some implementations, the detection platform (e.g., using a camera) may select the individual as the candidate for authentication by facial recognition if the individual enters a particular area (e.g., a bank, a stadium, an airport, and/or the like). For example, the detection platform may select the individual if the individual enters a particular area associated with a transaction device, such as a checkout area of a merchant, an ATM vestibule, and/or the like. In such a case, the particular area may include a proximity (e.g., 10 feet, 25 feet, 50 feet, and/or the like) of the transaction device. Thus, the detection platform may select the individual as the candidate for facial recognition if the individual is approaching the transaction device (e.g., enters the proximity). In some implementations, the detection platform may distinguish (e.g., utilizing a machine learning model) between individuals entering the proximity in order to use the transaction device and those merely passing through, based on a behavior of an individual, such as a direction of travel of the individual, a direction of an eye gaze of the individual, whether the individual is reaching into a bag or a pocket, and/or the like.

In some implementations, the detection platform may select the individual as the candidate for authentication by facial recognition if the individual requests access to a secure area. For example, the detection platform may select the individual if the individual requests access to an account (e.g., by inserting a transaction card into a transaction device, swiping a transaction card at a transaction device, and/or the like). As another example, the detection platform may select the individual if the individual requests access to a physical area (e.g., by entering an access code or presenting a credential at an access control system of the physical area).

As shown by reference number 110, the detection platform may identify a facial area of the individual selected as the candidate for facial recognition. For example, the detection platform may capture, or obtain, an image (e.g., a photograph or a video frame of a video) of the individual in order to identify the facial area of the individual from the image. In some implementations, a camera of a transaction device (e.g., an ATM device) may capture an image of the individual and provide the image to the detection platform. Additionally, or alternatively, a camera associated with a physical area (e.g., an ATM vestibule, an airport, a stadium, and/or the like) may capture an image of the individual and provide the image to the detection platform.

The detection platform may process the image of the individual to identify the facial area of the individual. For example, the detection platform may process the image using an artificial intelligence technique, such as machine learning, deep learning, and/or the like. For example, the detection platform may use a machine learning (e.g., computer vision) model to identify the facial area. For example, the detection platform may train the machine learning model based on one or more parameters associated with a facial area, such as shape, color, arrangement of features, and/or the like. The detection platform may train the machine learning model, according to the one or more parameters, using historical data associated with faces (e.g., images of faces). Using the historical data and the one or more parameters as inputs to the machine learning model, the detection platform may train the machine learning model to identify the facial area from an image of the individual. In some implementations, the detection platform may obtain and utilize a machine learning model that was trained by another device.

In some implementations, the detection platform may identify one or more other bodily areas of the individual from an image of the individual, in a manner similar to that described above. For example, the detection platform may identify an area of exposed skin of the individual that is not associated with the facial area of the individual. The area of exposed skin may relate to an ear, a neck, an arm, a hand, a leg, and/or the like of the individual.

As shown in FIG. 1B, and by reference number 115, the detection platform may identify a characteristic of the facial area of the individual. The characteristic may be unrelated to a facial feature (e.g., unrelated to eyes, a nose, a mouth, a jaw, and/or the like) of the facial area. For example, the characteristic may relate to a temperature of the facial area or a level of moisture (e.g., perspiration) of the facial area.

In some implementations, the detection platform may obtain the temperature of the facial area. In such a case, the detection platform may obtain the temperature of the facial area from a measurement of a temperature sensor. For example, the detection platform may obtain the temperature of the facial area from a measurement of an infrared (IR) sensor. In such a case, after identifying the facial area, the detection platform may cause the IR sensor to measure a level of IR light associated with the facial area. The detection platform may convert the measured level of IR light to a temperature. In some implementations, the IR sensor may be associated with an IR light source, and the IR sensor may measure a level of IR light from the IR light source that is reflected off the facial area.

In some implementations, the IR sensor and/or the IR light source may be stationary, and positioned so as to be directed to the facial area of the individual (e.g., positioned so as to be directed to the facial area of the individual when the individual is using an ATM device, entering an ATM vestibule, entering an airport, and/or the like). Alternatively, the IR sensor and/or the IR light source may be configured to change position to permit the IR sensor and/or the IR light source to be directed at the facial area of the individual during a movement of the individual.

In some implementations, the detection platform may include the IR sensor and/or the IR light source. Additionally, or alternatively, another device that is accessible to the detection platform may include the IR sensor and/or the IR light source. For example, a transaction device (e.g., an ATM device) that is in communication with the detection platform may include the IR sensor and/or the IR light source, and may provide IR light measurements obtained by the IR sensor to the detection platform.

In some implementations, the detection platform may obtain the level of moisture (e.g., perspiration) of the facial area. In such a case, the detection platform may obtain the level of moisture using a machine learning (e.g., computer vision) model in a manner similar to that described above. For example, the detection platform may train the machine learning model to identify perspiration from an image of the facial area of the individual. In some implementations, the detection platform may obtain and utilize a machine learning model that was trained by another device. The machine learning model may determine the level of moisture as a total area of the facial area where perspiration is identified, a percentage area of the facial area where perspiration is identified, and/or the like.

Additionally, or alternatively, the detection platform may obtain the level of moisture from an IR sensor, such as an IR sensor as described above. For example, the IR sensor may take IR light measurements, which may be converted to temperature measurements, from a plurality of locations on the facial area of the individual. Locations where perspiration is present may have lower temperatures than locations where perspiration is not present. Accordingly, the detection platform may identify a location as being associated with perspiration when the location has a temperature that does not satisfy a particular threshold (e.g., a threshold based on temperature measurements from the plurality of locations). In addition, the detection platform may determine the level of moisture as a total area of the facial area where perspiration is identified, a percentage area of the facial area where perspiration is identified, and/or the like.

Additionally, or alternatively, the detection platform may obtain the level of moisture from a galvanometer that measures a galvanic skin response (i.e., a change in electrical resistance of skin caused by perspiration). The detection platform may determine the level of moisture by converting a level of electrical resistance measured by the galvanometer. The detection platform, or another device accessible to the detection platform (e.g., an ATM device), may include a galvanometer in order to measure a galvanic skin response of the individual. In such a case, the detection platform, or the other device, may instruct the individual to place the individual's facial area in contact with the galvanometer in order to measure a galvanic skin response of the individual's facial area.

In some implementations, the detection platform also may identify a characteristic of the area of exposed skin of the individual (e.g., an area of exposed skin of an ear, a neck, a hand, and/or the like of the individual). For example, the detection platform may obtain a temperature or a level of moisture of the area of exposed skin in a manner similar to that described above.

In some implementations, the identified characteristic of the facial area of the individual may be a recess associated with an eye of the individual. The detection platform may obtain a measurement of the recess using a machine learning (e.g., computer vision) model, in a manner similar to that described above. For example, the detection platform may train the machine learning model to determine a recess of an eye from an image of the facial area of the individual. In some implementations, the detection platform may obtain and utilize a machine learning model that was trained by another device.

As shown by reference number 120, the detection platform may determine whether an appearance of the facial area of the individual is likely altered by a face-altering technology (e.g., a mask, a facial prosthetic, and/or the like). For example, the detection platform may determine, based on the identified characteristic of the facial area and/or the identified characteristic of the area of exposed skin, whether the appearance of the facial area is likely altered by a face-altering technology.

In some implementations, the detection platform may compare the identified characteristic of the facial area and the identified characteristic of the area of exposed skin in order to determine whether the appearance of the facial area is likely altered. For example, the detection platform may compare the temperature of the facial area and the temperature of the area of exposed skin. Since a face-altering technology may reduce heat that is emitted or reflected by the facial area relative to the area of exposed skin, the detection platform may determine that the appearance of the facial area is likely altered when the temperature of the facial area and the temperature of the area of exposed skin do not correspond (e.g., the temperature of the facial area is outside of a threshold range, such as ±1%, ±5%, and/or the like, of the temperature of the area of exposed skin). Conversely, the detection platform may determine that the appearance of the facial area is likely not altered when the temperature of the facial area and the temperature of the area of exposed skin correspond.

As another example, the detection platform may compare the level of moisture (e.g., perspiration) of the facial area and the level of moisture of the area of exposed skin. Since a face-altering technology may obstruct perspiration present on the facial area, the detection platform may determine that the appearance of the facial area is likely altered when the level of moisture of the facial area and the level of moisture of the area of exposed skin do not correspond (e.g., the level of moisture of the facial area is outside of a threshold range, such as ±1%, ±5%, and/or the like, of the level of moisture of the area of exposed skin). Conversely, the detection platform may determine that the appearance of the facial area is likely not altered when the level of moisture of the facial area and the level of moisture of the area of exposed skin correspond.

In some implementations, the detection platform may compare the identified characteristic of the facial area to an estimated value for the characteristic of the facial area. For example, the detection platform may compare the temperature of the facial area to an estimated temperature for the facial area. The detection platform may utilize a machine learning model to determine the estimated temperature, in a manner similar to that described above. For example, the detection platform may train the machine learning model based on one or more parameters associated with a facial temperature, such as an outdoors temperature, a location of an individual (e.g., indoors or outdoors (e.g., a transaction device, such as an ATM device, may be located indoors or outdoors)), an indoors temperature, an amount of exposed skin of an individual, and/or the like. The detection platform may train the machine learning model, according to the one or more parameters, using historical data associated with facial temperatures. Using the historical data and the one or more parameters as inputs to the machine learning model, the detection platform may train the machine learning model to determine an estimated facial temperature for the facial area of the individual. In some implementations, the detection platform may obtain and utilize a machine learning model that was trained by another device. Since a face-altering technology may reduce heat that is emitted or reflected by the facial area, the detection platform may determine that the appearance of the facial area is likely altered when the temperature of the facial area and the estimated temperature for the facial area do not correspond (e.g., the temperature of the facial area is outside of a threshold range, such as ±1%, ±5%, and/or the like, of the estimated temperature for the facial area). Conversely, the detection platform may determine that the appearance of the facial area is likely not altered when the temperature of the facial area and the estimated temperature for the facial area correspond.

As another example, the detection platform may compare the level of moisture of the facial area to an estimated level of moisture for the facial area. The detection platform may utilize a machine learning model to determine the estimated moisture level, in a manner similar to that described above. Since a face-altering technology may obstruct perspiration present on the facial area, the detection platform may determine that the appearance of the facial area is likely altered when the level of moisture of the facial area and the estimated level of moisture for the facial area do not correspond (e.g., the level of moisture of the facial area is outside of a threshold range, such as ±1%, ±5%, and/or the like, of the estimated level of moisture for the facial area). Conversely, the detection platform may determine that the appearance of the facial area is likely not altered when the level of moisture of the facial area and the estimated level of moisture for the facial area correspond.

In some implementations, the detection platform may determine whether the appearance of the facial area of the individual is likely altered by a face-altering technology based on the measurement of the recess of the eye of the individual. For example, the detection platform may determine whether the measurement of the recess exceeds a threshold value associated with a normal recess of an eye. The threshold value may be based on an aggregate (e.g., average) measurement determined from a plurality of individuals (e.g., a plurality of individuals having one or more facial features that are similar to those of the individual). Since a face-altering technology, such as a mask, may protrude from the individual's face, thereby causing a deeper eye recess, the detection platform may determine that the appearance of the facial area is likely altered when the measurement of the recess of the eye of the individual exceeds the threshold value. Conversely, the detection platform may determine that the appearance of the facial area is likely not altered when the measurement of the recess of the eye of the individual does not exceed the threshold value.

In some implementations, the detection platform may employ any combination of the foregoing techniques for determining whether the appearance of the facial area of the individual is likely altered by a face-altering technology. For example, the detection platform may determine whether the appearance of the facial area is likely altered based on any one or more of whether a temperature of the facial area corresponds to a temperature of the area of exposed skin, whether a level of moisture of the facial area corresponds to a level of moisture of the area of exposed skin, whether a temperature of the facial area corresponds to an estimated temperature for the facial area, whether a level of moisture of the facial area corresponds to an estimated level of moisture for the facial area, or whether a recess of an eye of the individual exceeds a threshold value.

In some implementations, the detection platform may determine whether the appearance of the facial area of the individual is likely altered by a face-altering technology prior to performing facial recognition on the individual. For example, the detection platform may determine whether the appearance of the facial area is likely altered before the individual requests access to a secure area, to thereby determine whether facial recognition is to be performed on the individual. For example, the detection platform may determine whether the appearance of the facial area is likely altered when the individual is approaching a transaction device (e.g., before the individual requests access to a secure area via the transaction device). In this way, the detection platform may determine a manner in which the individual is to be authenticated before the individual requests access to a secure area, thereby improving a speed and an efficiency of an authentication process.

As shown by reference number 125, the detection platform may selectively perform facial recognition on the facial area of the individual based on whether the appearance of the facial area is likely altered by a face-altering technology. For example, the detection platform may determine not to perform facial recognition on the facial area based on determining that the appearance of the facial area is likely altered. In such a case, the detection platform may determine that the individual is to be authenticated according to a technique that does not include facial recognition. For example, the detection platform may prompt, or cause another device to prompt, the individual to provide a password, a personal identification number (PIN), a biometric identifier, and/or the like based on determining that the appearance of the facial area is likely altered. In this way, the detection platform conserves computing resources associated with facial recognition by determining not to perform facial recognition when facial recognition is unlikely to produce an accurate result (e.g., when the individual is utilizing a face-altering technology).

In some implementations, based on determining that the appearance of the facial area is likely altered, the detection platform may administer, or cause another device to administer, a facial expression challenge to the individual. For example, the detection platform, or the other device, may request that the individual perform one or more facial expressions, such as smiling, frowning, pouting, raising one or both eyebrows, and/or the like. Continuing with the previous example, the detection platform, or the other device, may determine whether the performed facial expressions indicate that the appearance of the facial area of the individual is likely altered by a face-altering technology. This may include determining (e.g., using a machine learning model) whether a relative position, size, shape, and/or the like of the performed facial expressions correspond to reference facial expressions (e.g., facial expressions performed by one or more individuals not utilizing a face-altering technology). Based on determining that one or more of the performed facial expressions do not correspond to the reference facial expressions, the detection platform, or the other device, may determine that the individual is not to be authenticated according to facial recognition.

In some implementations, the detection platform may perform one or more actions based on determining that the appearance of the facial area of the individual is likely altered by a face-altering technology. For example, if the individual is attempting to access a secure area (e.g., an account), the detection platform may lock the secure area (e.g., for a time period), require one or more additional authentication factors to access the secure area (e.g., for a time period), transmit a notification to a user device of an owner of the secure area indicating suspicious activity, transmit a notification to a user device of a law enforcement agency indicating suspicious activity, and/or the like. As another example, the detection platform may perform facial recognition on the facial area of the individual in order to determine an identity of a person being impersonated by the individual, and may lock one or more accounts associated with the person, require one or more additional authentication factors to access the one or more accounts, transmit a notification to a user device of the person indicating an impersonation attempt, transmit a notification to a user device of a law enforcement agency indicating an impersonation attempt, and/or the like.

In some implementations, the detection platform may determine to authenticate the individual according to facial recognition based on determining that the appearance of the facial area of the individual is likely not altered by a face-altering technology. In such a case, the detection platform may utilize a facial recognition system, as described above, to determine an identity of the individual based on an image of the individual. In some implementations, the detection platform may determine whether the identity matches that of an owner of an account the individual was attempting to access, an owner of a credential that the individual was using, and/or the like to thereby authenticate the individual. In this way, the detection platform performs facial recognition when facial recognition is likely to produce an accurate result (e.g., when the individual is not utilizing a face-altering technology), thereby conserving computing resources and reducing instances of misidentification as well as illegal activity that may be permitted by misidentification.

As indicated above, FIGS. 1A and 1B are provided as one or more examples. Other examples may differ from what is described with regard to FIGS. 1A and 1B.

Figure 2:
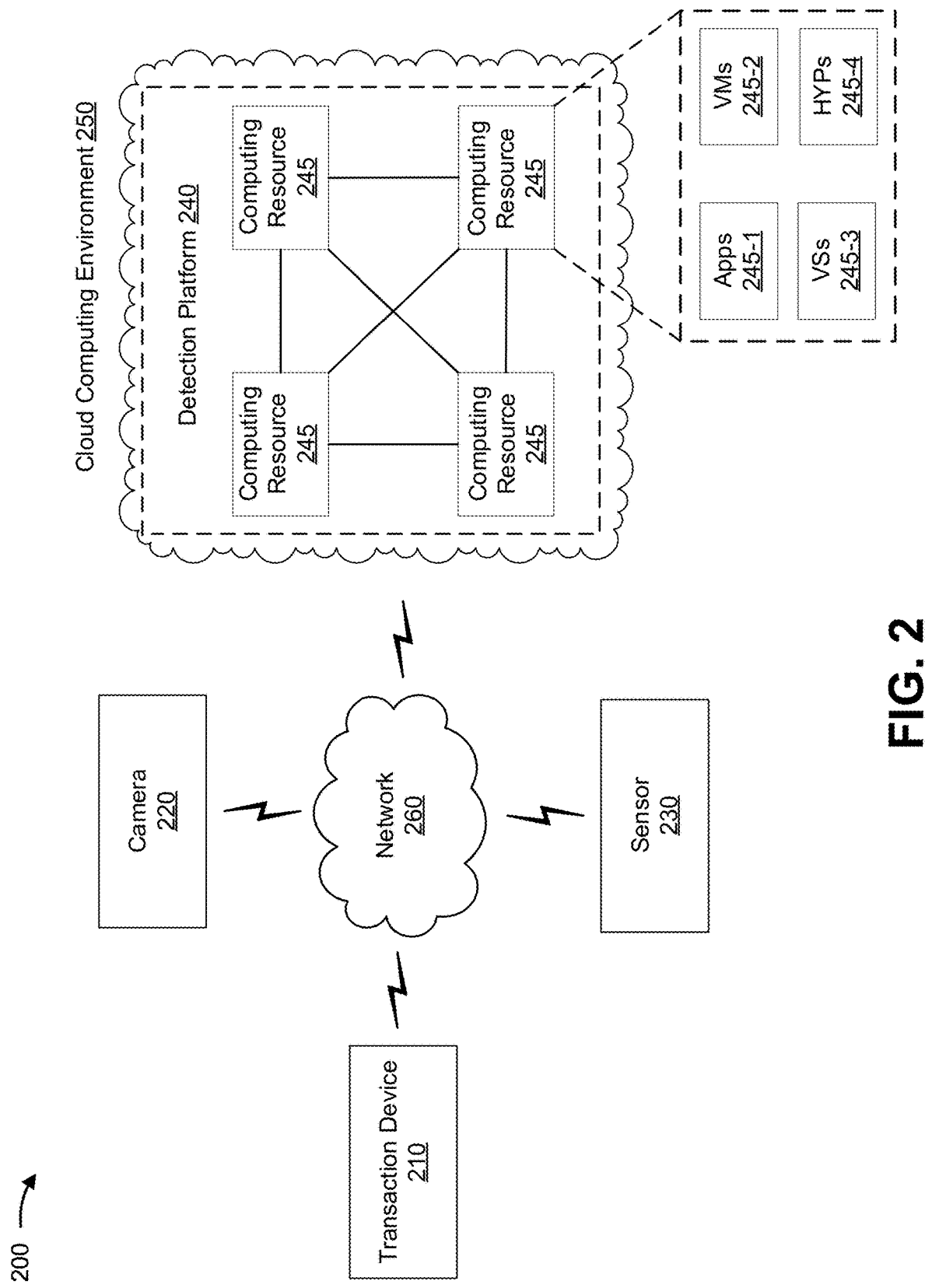
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a transaction device 210, a camera 220, a sensor 230, a detection platform 240, a computing resource 245, a cloud computing environment 250, and a network 260. Devices of environment 200 may interconnect via wired connections, wireless connections, or a combination of wired and wireless connections.

Transaction device 210 includes one or more devices capable of receiving, generating, storing, processing, and/or providing information relating to a transaction (e.g., a transaction relating to a cash withdrawal, a use of a transaction card, and/or the like). For example, transaction device 210 may include an ATM device, a point of sale (POS) device, a kiosk device, and/or the like. An ATM device may include an electronic telecommunications device that enables customers of financial institutions to perform financial transactions, such as cash withdrawals, deposits, transferring funds, obtaining account information, and/or the like, at any time and without direct interaction with employees of the financial institutions. A POS device may include an electronic device used to process transaction card payments at a retail location. The POS device may read information from a transaction card (e.g., a credit card, a debit card, a gift card, and/or the like), and may determine whether there are sufficient funds in an account associated with the transaction card for a transaction. The POS device may cause a transfer of funds from the account associated with the transaction card to an account of a retailer and may record the transaction. A kiosk device may include a computer terminal featuring specialized hardware and software that provides access to information and/or applications for communication, commerce, entertainment, education, and/or the like.

Camera 220 includes one or more devices capable of capturing video data, an image, and/or the like. For example, camera 220 may include a video camera, a still image camera, an infrared camera, and/or the like. In some implementations, camera 220 may capture an image of an individual and may provide the image to detection platform 240, as described elsewhere herein. In some implementations, camera 220 may process an image in a manner that is the same as or similar to that described elsewhere herein, and may provide a result of processing the image to transaction device 210 or detection platform 240 for further processing, for analysis, and/or the like, as described elsewhere herein.

Sensor 230 includes one or more devices capable of detecting and reporting data relating to a measurable parameter of an individual that is a candidate for authentication by facial recognition. For example, sensor 230 may include a temperature sensor, an infrared sensor, a moisture sensor, and/or the like. In some implementations, sensor 230 may process the data in a manner that is the same as or similar to that described elsewhere herein, and may provide a result of processing the data to transaction device 210 or detection platform 240 for further processing, for analysis, and/or the like, as described elsewhere herein.

Detection platform 240 includes one or more computing resources assigned to determine whether an appearance of a facial area of an individual is likely altered by a face-altering technology. For example, detection platform 240 may be a platform implemented by cloud computing environment 250 that may select an individual that is a candidate for facial recognition, identify a facial area of the individual, identify a characteristic of the facial area, determine whether an appearance of the facial area is likely altered by a face-altering technology, perform facial recognition on the facial area, and/or the like. In some implementations, detection platform 240 is implemented by computing resources 245 of cloud computing environment 250.

Detection platform 240 may include a server device or a group of server devices. In some implementations, detection platform 240 may be hosted in cloud computing environment 250. Notably, while implementations described herein may describe detection platform 240 as being hosted in cloud computing environment 250, in some implementations, detection platform 240 may be non-cloud-based or may be partially cloud-based. For example, in some implementations, detection platform 240 may be implemented by transaction device 210.

Cloud computing environment 250 includes an environment that delivers computing as a service, whereby shared resources, services, and/or the like may be provided to transaction device 210, camera 220, sensor 230, and/or the like. Cloud computing environment 250 may provide computation, software, data access, storage, and/or other services that do not require end-user knowledge of a physical location and configuration of a system and/or a device that delivers the services. As shown, cloud computing environment 250 may include detection platform 240 and computing resource 245.

Computing resource 245 includes one or more personal computers, workstation computers, server devices, or another type of computation and/or communication device. In some implementations, computing resource 245 may host detection platform 240. The cloud resources may include compute instances executing in computing resource 245, storage devices provided in computing resource 245, data transfer devices provided by computing resource 245, and/or the like. In some implementations, computing resource 245 may communicate with other computing resources 245 via wired connections, wireless connections, or a combination of wired and wireless connections.

As further shown in FIG. 2, computing resource 245 may include a group of cloud resources, such as one or more applications ("APPs") 245-1, one or more virtual machines ("VMs") 245-2, virtualized storage ("VSs") 245-3, one or more hypervisors ("HYPs") 245-4, or the like.

Application 245-1 includes one or more software applications that may be provided to or accessed by transaction device 210, camera 220, sensor 230, and/or the like. Application 245-1 may eliminate a need to install and execute the software applications on transaction device 210, camera 220, sensor 230, and/or the like. For example, application 245-1 may include software associated with detection platform 240 and/or any other software capable of being provided via cloud computing environment 250. In some implementations, one application 245-1 may send/receive information to/from one or more other applications 245-1, via virtual machine 245-2.

Virtual machine 245-2 includes a software implementation of a machine (e.g., a computer) that executes programs like a physical machine. Virtual machine 245-2 may be either a system virtual machine or a process virtual machine, depending upon use and degree of correspondence to any real machine by virtual machine 245-2. A system virtual machine may provide a complete system platform that supports execution of a complete operating system ("OS"). A process virtual machine may execute a single program and may support a single process. In some implementations, virtual machine 245-2 may execute on behalf of a user, and may manage infrastructure of cloud computing environment 250, such as data management, synchronization, or long-duration data transfers.

Virtualized storage 245-3 includes one or more storage systems and/or one or more devices that use virtualization techniques within the storage systems or devices of computing resource 245. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 245-4 provides hardware virtualization techniques that allow multiple operating systems (e.g., "guest operating systems") to execute concurrently on a host computer, such as computing resource 245. Hypervisor 245-4 may present a virtual operating platform to the guest operating systems and may manage the execution of the guest operating systems. Multiple instances of a variety of operating systems may share virtualized hardware resources.

Network 260 includes one or more wired and/or wireless networks. For example, network 260 may include a cellular network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The quantity and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
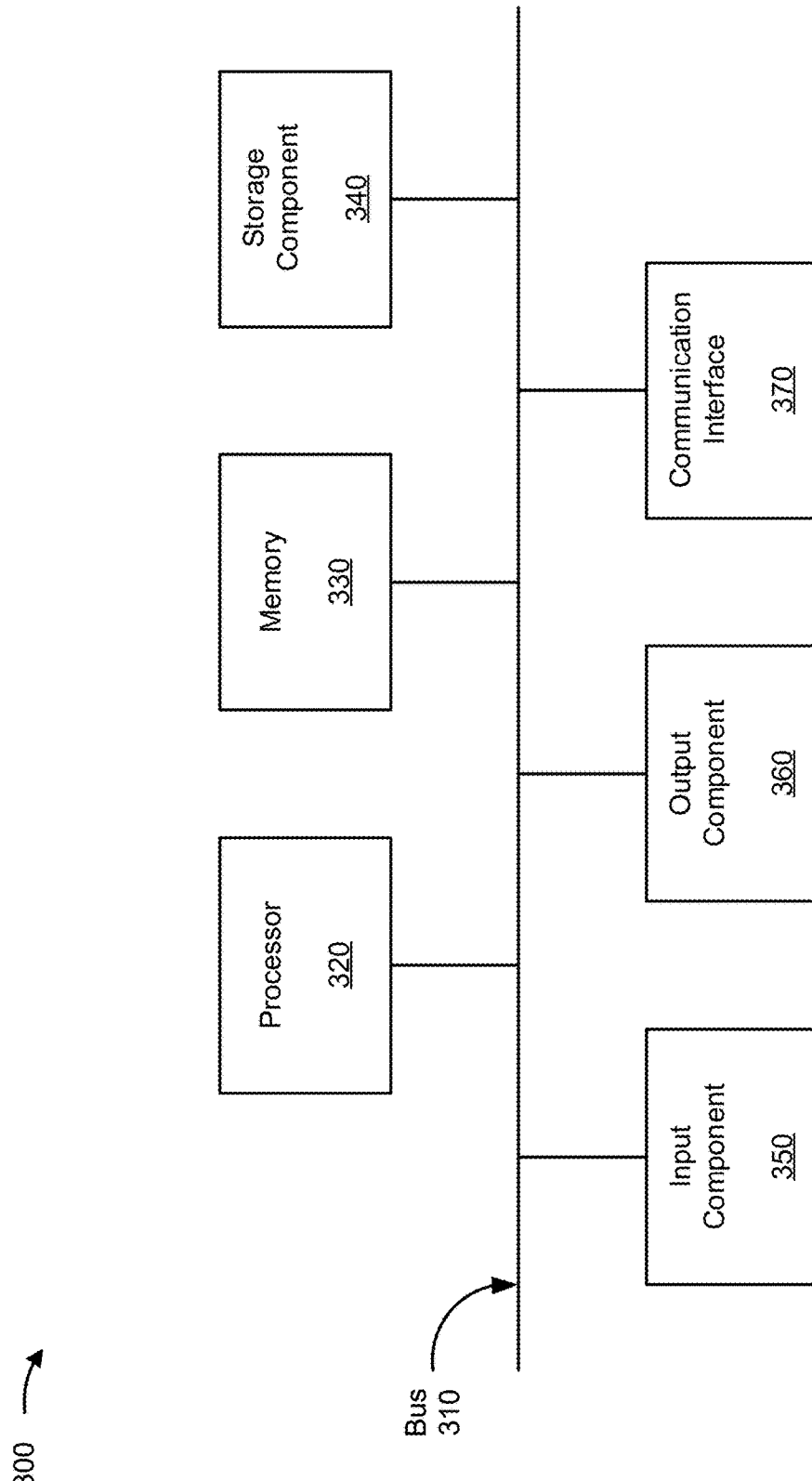
FIG. 3 is a diagram of example components of one or more devices of FIG. 2.

FIG. 3 is a diagram of example components of a device 300. Device 300 may correspond to transaction device 210, camera 220, sensor 230, detection platform 240, and/or computing resource 245. In some implementations, transaction device 210, camera 220, sensor 230, detection platform 240, and/or computing resource 245 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The quantity and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
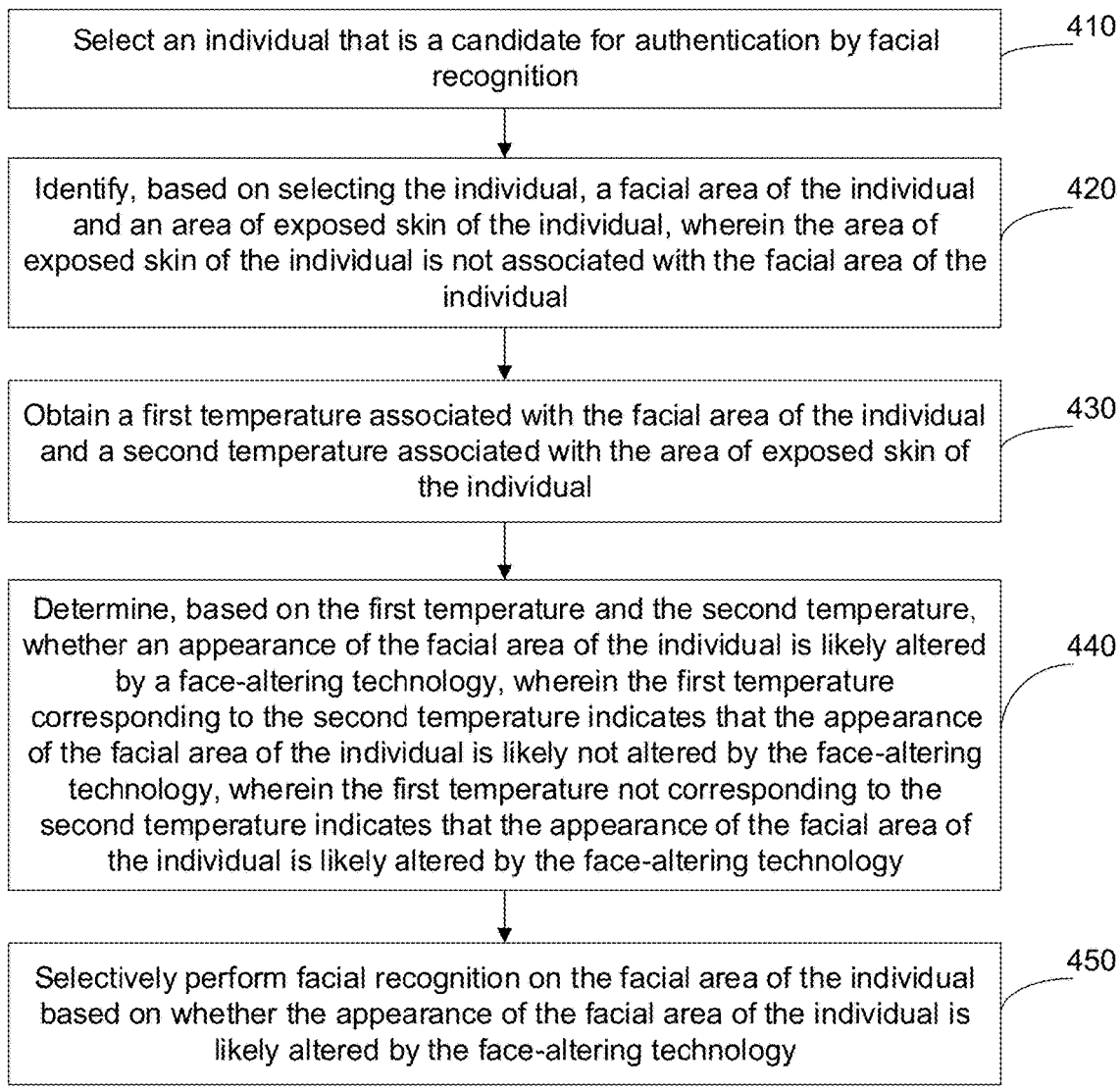
FIGS. 4-6 are flow charts of example processes for detecting attempts to defeat facial recognition.

FIG. 4 is a flow chart of an example process 400 for detecting attempts to defeat facial recognition. In some implementations, one or more process blocks of FIG. 4 may be performed by a detection platform (e.g., detection platform 240). In some implementations, one or more process blocks of FIG. 4 may be performed by another device or a group of devices separate from or including the detection platform, such as a transaction device (e.g., transaction device 210), a camera (e.g., camera 220), a sensor (e.g., sensor 230), and/or the like.

As shown in FIG. 4, process 400 may include selecting an individual that is a candidate for authentication by facial recognition (block 410). For example, the detection platform (e.g., using camera 220, computing resource 245, processor 320, memory 330, storage component 340, input component 350, communication interface 370, and/or the like) may select an individual that is a candidate for authentication by facial recognition, as described above.

As further shown in FIG. 4, process 400 may include identifying, based on selecting the individual, a facial area of the individual and an area of exposed skin of the individual, wherein the area of exposed skin of the individual is not associated with the facial area of the individual (block 420). For example, the detection platform (e.g., using camera 220, computing resource 245, processor 320, memory 330, storage component 340, and/or the like) may identify, based on selecting the individual, a facial area of the individual and an area of exposed skin of the individual, as described above.

In some implementations, the area of exposed skin of the individual is not associated with the facial area of the individual.

As further shown in FIG. 4, process 400 may include obtaining a first temperature associated with the facial area of the individual and a second temperature associated with the area of exposed skin of the individual (block 430). For example, the detection platform (e.g., using sensor 230, computing resource 245, processor 320, memory 330, storage component 340, input component 350, communication interface 370, and/or the like) may obtain a first temperature associated with the facial area of the individual and a second temperature associated with the area of exposed skin of the individual, as described above.

As further shown in FIG. 4, process 400 may include determining, based on the first temperature and the second temperature, whether an appearance of the facial area of the individual is likely altered by a face-altering technology, wherein the first temperature corresponding to the second temperature indicates that the appearance of the facial area of the individual is likely not altered by the face-altering technology, and wherein the first temperature not corresponding to the second temperature indicates that the appearance of the facial area of the individual is likely altered by the face-altering technology (block 440). For example, the detection platform (e.g., using computing resource 245, processor 320, memory 330, storage component 340, and/or the like) may determine, based on the first temperature and the second temperature, whether an appearance of the facial area of the individual is likely altered by a face-altering technology, as described above. In some implementations, the first temperature corresponding to the second temperature indicates that the appearance of the facial area of the individual is likely not altered by the face-altering technology. In some implementations, the first temperature not corresponding to the second temperature indicates that the appearance of the facial area of the individual is likely altered by the face-altering technology.

As further shown in FIG. 4, process 400 may include selectively performing facial recognition on the facial area of the individual based on whether the appearance of the facial area of the individual is likely altered by the face-altering technology (block 450). For example, the detection platform (e.g., using computing resource 245, processor 320, memory 330, storage component 340, and/or the like) may selectively perform facial recognition on the facial area of the individual based on whether the appearance of the facial area of the individual is likely altered by the face-altering technology, as described above.

Process 400 may include additional implementations, such as any single implementation or any combination of implementations described below and/or in connection with one or more other processes described elsewhere herein.

In a first implementation, selecting the individual that is the candidate for authentication by facial recognition may include selecting the individual that is the candidate for authentication by facial recognition based on a proximity of the individual to a transaction device.

In a second implementation, alone or in combination with the first implementation, process 400 may further include determining a first perspiration level on the facial area of the individual and determining a second perspiration level on the area of exposed skin of the individual, where the first temperature corresponding to the second temperature and the first perspiration level corresponding to the second perspiration level indicates that the appearance of the facial area of the individual is likely not altered by the face-altering technology, and where the first temperature not corresponding to the second temperature or the first perspiration level not corresponding to the second perspiration level indicates that the appearance of the facial area of the individual is likely altered by the face-altering technology. In a third implementation, alone or in combination with one or more of the first and second implementations, the first perspiration level and the second perspiration level may be determined by one or more of computer vision, infrared moisture detection, or galvanic skin response detection.

In a fourth implementation, alone or in combination with one or more of the first through third implementations, process 400 may further include determining that the appearance of the facial area of the individual is likely not altered by the face-altering technology, and performing authentication of the individual using facial recognition, or alternatively, determining that the appearance of the facial area of the individual is likely altered by the face-altering technology, and performing authentication of the individual using a technique that does not include facial recognition.

In a fifth implementation, alone or in combination with one or more of the first through fourth implementations, the face-altering technology may be at least one of a mask, a facial prosthetic, a bandage, or an eyepatch.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
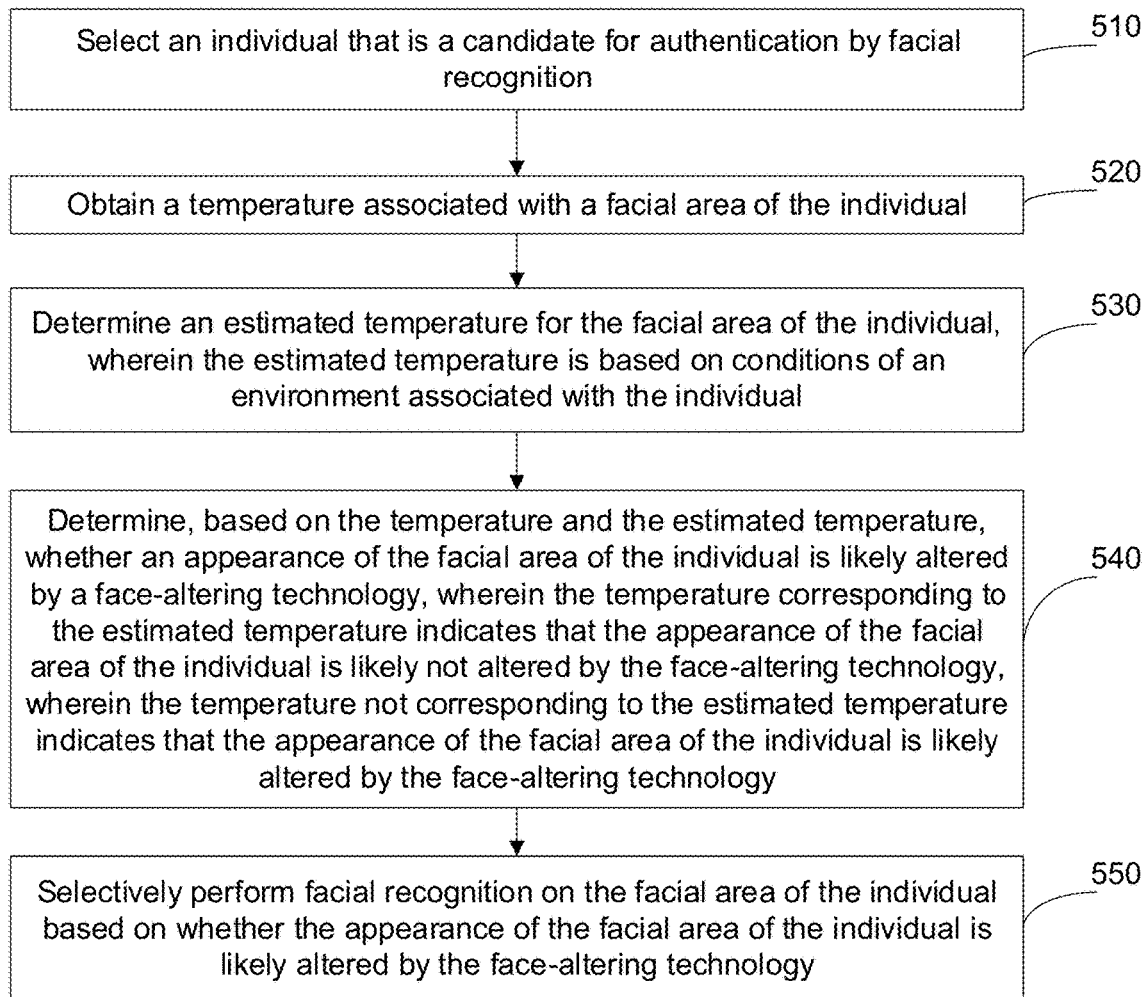

FIG. 5 is a flow chart of an example process 500 for detecting attempts to defeat facial recognition. In some implementations, one or more process blocks of FIG. 5 may be performed by a detection platform (e.g., detection platform 240). In some implementations, one or more process blocks of FIG. 5 may be performed by another device or a group of devices separate from or including the detection platform, such as a transaction device (e.g., transaction device 210), a camera (e.g., camera 220), a sensor (e.g., sensor 230), and/or the like.

As shown in FIG. 5, process 500 may include selecting an individual that is a candidate for authentication by facial recognition (block 510). For example, the detection platform (e.g., using camera 220, computing resource 245, processor 320, memory 330, storage component 340, input component 350, communication interface 370, and/or the like) may select an individual that is a candidate for authentication by facial recognition, as described above.

As further shown in FIG. 5, process 500 may include obtaining a temperature associated with a facial area of the individual (block 520). For example, the detection platform (e.g., using sensor 230, computing resource 245, processor 320, memory 330, storage component 340, input component 350, communication interface 370, and/or the like) may obtain a temperature associated with a facial area of the individual, as described above.

As further shown in FIG. 5, process 500 may include determining an estimated temperature for the facial area of the individual, wherein the estimated temperature is based on conditions of an environment associated with the individual (block 530). For example, the detection platform (e.g., using computing resource 245, processor 320, memory 330, storage component 340, and/or the like) may determine an estimated temperature for the facial area of the individual, as described above. In some implementations, the estimated temperature is based on conditions of an environment associated with the individual.

As further shown in FIG. 5, process 500 may include determining, based on the temperature and the estimated temperature, whether an appearance of the facial area of the individual is likely altered by a face-altering technology, wherein the temperature corresponding to the estimated temperature indicates that the appearance of the facial area of the individual is likely not altered by the face-altering technology, and wherein the temperature not corresponding to the estimated temperature indicates that the appearance of the facial area of the individual is likely altered by the face-altering technology (block 540). For example, the detection platform (e.g., using computing resource 245, processor 320, memory 330, storage component 340, and/or the like) may determine, based on the temperature and the estimated temperature, whether an appearance of the facial area of the individual is likely altered by a face-altering technology, as described above. In some implementations, the temperature corresponding to the estimated temperature indicates that the appearance of the facial area of the individual is likely not altered by the face-altering technology. In some implementations, the temperature not corresponding to the estimated temperature indicates that the appearance of the facial area of the individual is likely altered by the face-altering technology.

As further shown in FIG. 5, process 500 may include selectively performing facial recognition on the facial area of the individual based on whether the appearance of the facial area of the individual is likely altered by the face-altering technology (block 550). For example, the detection platform (e.g., using computing resource 245, processor 320, memory 330, storage component 340, and/or the like) may selectively perform facial recognition on the facial area of the individual based on whether the appearance of the facial area of the individual is likely altered by the face-altering technology, as described above.

Process 500 may include additional implementations, such as any single implementation or any combination of implementations described below and/or in connection with one or more other processes described elsewhere herein.

In a first implementation, obtaining the temperature associated with the facial area of the individual and determining whether the temperature corresponds to the estimated temperature for the facial area of the individual may include obtaining the temperature associated with the facial area of the individual and determining whether the temperature corresponds to the estimated temperature for the facial area of the individual before the individual is within a threshold distance from a transaction device.

In a second implementation, alone or in combination with the first implementation, process 500 may further include determining that the appearance of the facial area of the individual is likely not altered by the face-altering technology, and performing authentication of the individual using facial recognition, or alternatively, determining that the appearance of the facial area of the individual is likely altered by the face-altering technology, and performing authentication of the individual using a technique that does not include facial recognition.

In a third implementation, alone or in combination with one or more of the first and second implementations, determining the estimated temperature for the facial area of the individual may include determining the estimated temperature for the facial area of the individual using a machine learning model.

In a fourth implementation, alone or in combination with one or more of the first through third implementations, process 500 may further include determining whether a recess associated with an eye of the individual satisfies a threshold value, where the temperature corresponding to the estimated temperature and the recess associated with the eye satisfying the threshold value indicates that the appearance of the facial area of the individual is likely not altered by the face-altering technology, and where the temperature not corresponding to the estimated temperature or the recess associated with the eye failing to satisfy the threshold value indicates that the appearance of the facial area of the individual is likely altered by the face-altering technology.

In a fifth implementation, alone or in combination with one or more of the first through fourth implementations, process 500 may further include determining that the appearance of the facial area of the individual is likely altered by the face-altering technology, requesting that the individual perform one or more facial expressions, determining that the one or more facial expressions indicate that the appearance of the facial area of the individual is likely altered by the face-altering technology, and determining that the individual is not to be authenticated according to facial recognition.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
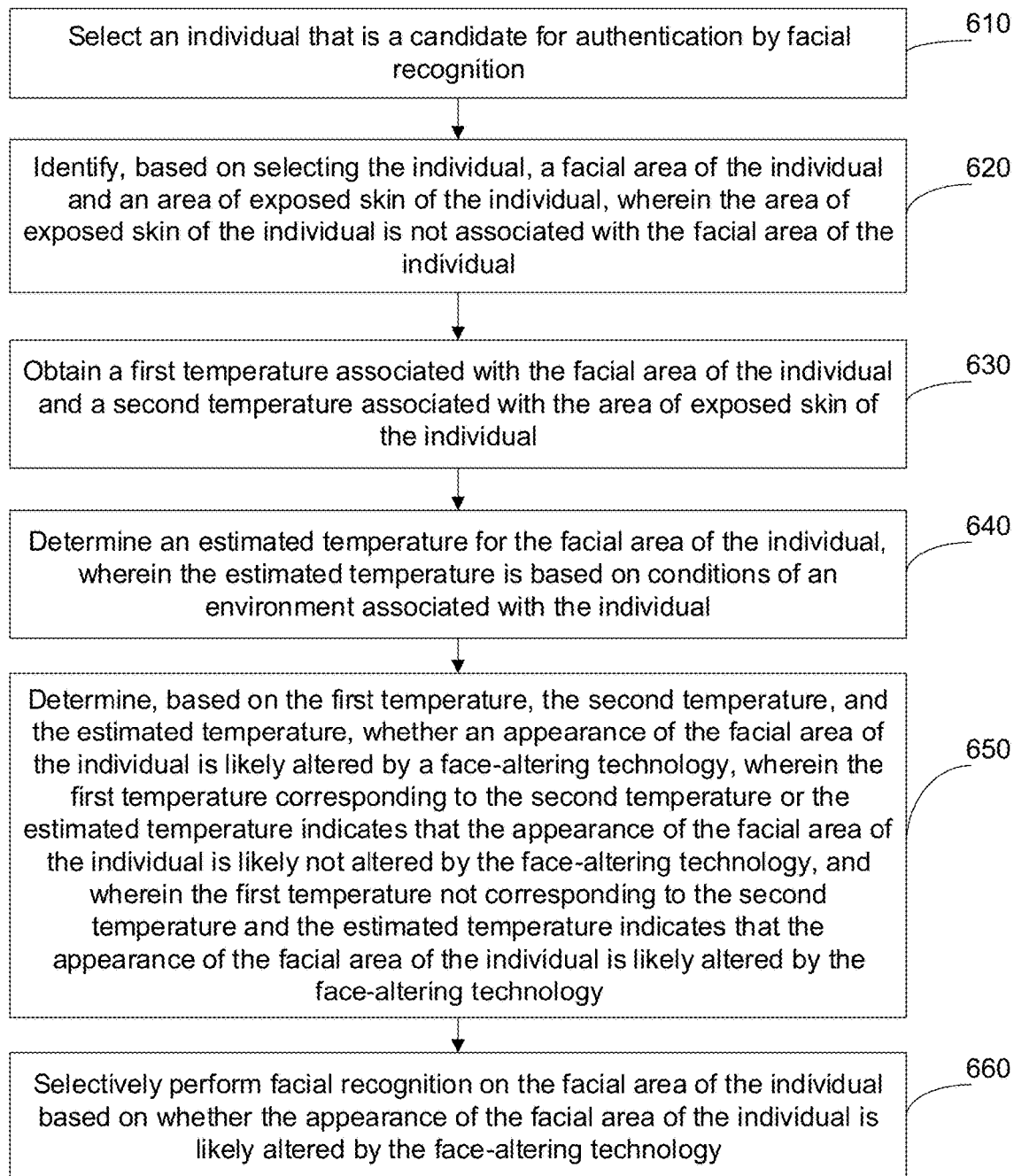

FIG. 6 is a flow chart of an example process 600 for detecting attempts to defeat facial recognition. In some implementations, one or more process blocks of FIG. 6 may be performed by a detection platform (e.g., detection platform 240). In some implementations, one or more process blocks of FIG. 6 may be performed by another device or a group of devices separate from or including the detection platform, such as a transaction device (e.g., transaction device 210), a camera (e.g., camera 220), a sensor (e.g., sensor 230), and/or the like.

As shown in FIG. 6, process 600 may include selecting an individual that is a candidate for authentication by facial recognition (block 610). For example, the detection platform (e.g., using camera 220, computing resource 245, processor 320, memory 330, storage component 340, input component 350, communication interface 370, and/or the like) may select an individual that is a candidate for authentication by facial recognition, as described above.

As further shown in FIG. 6, process 600 may include identifying, based on selecting the individual, a facial area of the individual and an area of exposed skin of the individual, wherein the area of exposed skin of the individual is not associated with the facial area of the individual (block 620). For example, the detection platform (e.g., using camera 220, computing resource 245, processor 320, memory 330, storage component 340, and/or the like) may identify, based on selecting the individual, a facial area of the individual and an area of exposed skin of the individual, as described above. In some implementations, the area of exposed skin of the individual is not associated with the facial area of the individual.

As further shown in FIG. 6, process 600 may include obtaining a first temperature associated with the facial area of the individual and a second temperature associated with the area of exposed skin of the individual (block 630). For example, the detection platform (e.g., using sensor 230, computing resource 245, processor 320, memory 330, storage component 340, input component 350, communication interface 370, and/or the like) may obtain a first temperature associated with the facial area of the individual and a second temperature associated with the area of exposed skin of the individual, as described above.

As further shown in FIG. 6, process 600 may include determining an estimated temperature for the facial area of the individual, wherein the estimated temperature is based on conditions of an environment associated with the individual (block 640). For example, the detection platform (e.g., using computing resource 245, processor 320, memory 330, storage component 340, and/or the like) may determine an estimated temperature for the facial area of the individual, as described above. In some implementations, the estimated temperature is based on conditions of an environment associated with the individual.

As further shown in FIG. 6, process 600 may include determining, based on the first temperature, the second temperature, and the estimated temperature, whether an appearance of the facial area of the individual is likely altered by a face-altering technology, wherein the first temperature corresponding to the second temperature or the estimated temperature indicates that the appearance of the facial area of the individual is likely not altered by the face-altering technology, and wherein the first temperature not corresponding to the second temperature and the estimated temperature indicates that the appearance of the facial area of the individual is likely altered by the face-altering technology (block 650). For example, the detection platform (e.g., using computing resource 245, processor 320, memory 330, storage component 340, and/or the like) may determine, based on the first temperature, the second temperature, and the estimated temperature, whether an appearance of the facial area of the individual is likely altered by a face-altering technology, as described above. In some implementations, the first temperature corresponding to the second temperature or the estimated temperature indicates that the appearance of the facial area of the individual is likely not altered by the face-altering technology. In some implementations, the first temperature not corresponding to the second temperature and the estimated temperature indicates that the appearance of the facial area of the individual is likely altered by the face-altering technology.

As further shown in FIG. 6, process 600 may include selectively performing facial recognition on the facial area of the individual based on whether the appearance of the facial area of the individual is likely altered by the face-altering technology (block 660). For example, the detection platform (e.g., using computing resource 245, processor 320, memory 330, storage component 340, and/or the like) may selectively perform facial recognition on the facial area of the individual based on whether the appearance of the facial area of the individual is likely altered by the face-altering technology, as described above.

Process 600 may include additional implementations, such as any single implementation or any combination of implementations described below and/or in connection with one or more other processes described elsewhere herein.

In a first implementation, selecting the individual that is the candidate for authentication by facial recognition may include selecting the individual that is the candidate for authentication by facial recognition based on a request by the individual to access an account.

In a second implementation, alone or in combination with the first implementation, process 600 may further include determining that the appearance of the facial area of the individual is likely not altered by the face-altering technology, and performing authentication of the individual using facial recognition, or alternatively, determining that the appearance of the facial area of the individual is likely altered by the face-altering technology, and performing authentication of the individual using a technique that does not include facial recognition.

In a third implementation, alone or in combination with one or more of the first and second implementations, identifying the facial area of the individual and the area of exposed skin of the individual may include identifying the facial area of the individual and the area of exposed skin of the individual using computer vision.

In a fourth implementation, alone or in combination with one or more of the first through third implementations, obtaining the first temperature associated with the facial area of the individual and the second temperature associated with the area of exposed skin of the individual may include obtaining the first temperature associated with the facial area of the individual and the second temperature associated with the area of exposed skin of the individual from an infrared sensor.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   selecting, by a device, an individual that is a candidate for authentication by facial recognition;
   identifying, by the device and based on selecting the individual, a facial area of the individual and an area of exposed skin of the individual,
      wherein the area of exposed skin of the individual is not associated with the facial area of the individual;
   obtaining, by the device, a first temperature associated with the facial area of the individual and a second temperature associated with the area of exposed skin of the individual;
   determining, by the device and based on a comparison of the first temperature and the second temperature, whether the first temperature is outside of a threshold difference in temperature range with respect to the second temperature;
   determining, by the device and based on determining whether the first temperature is outside of the threshold difference in temperature range with respect to the second temperature, whether an appearance of the facial area of the individual is likely altered by a face-altering technology,
      wherein the first temperature being within the threshold difference in temperature range with respect to the second temperature indicates that the appearance of the facial area of the individual is likely not altered by the face-altering technology,
      wherein the first temperature being outside of the threshold difference in temperature range with respect to the second temperature indicates that the appearance of the facial area of the individual is likely altered by the face-altering technology; and
   selectively performing, by the device, facial recognition on the facial area of the individual based on whether the appearance of the facial area of the individual is likely altered by the face-altering technology.

2. The method of claim 1, wherein selecting the individual that is the candidate for authentication by facial recognition comprises:
   selecting the individual that is the candidate for authentication by facial recognition based on a proximity of the individual to a transaction device.

3. The method of claim 1, further comprising:
   determining a first perspiration level on the facial area of the individual and determining a second perspiration level on the area of exposed skin of the individual,
      wherein the first temperature corresponding to the second temperature and the first perspiration level corresponding to the second perspiration level indicates that the appearance of the facial area of the individual is likely not altered by the face-altering technology,
      wherein the first temperature not corresponding to the second temperature or the first perspiration level not corresponding to the second perspiration level indicates that the appearance of the facial area of the individual is likely altered by the face-altering technology.

4. The method of claim 3, wherein the first perspiration level and the second perspiration level are determined by one or more of:
   computer vision,
   infrared moisture detection, or
   galvanic skin response detection.

5. The method of claim 1, further comprising:
   determining that the appearance of the facial area of the individual is likely not altered by the face-altering technology; and
   performing authentication of the individual using facial recognition.

6. The method of claim 1, further comprising:
   determining that the appearance of the facial area of the individual is likely altered by the face-altering technology; and
   performing authentication of the individual using a technique that does not include facial recognition.

7. The method of claim 1, wherein the face-altering technology is at least one of a mask, a facial prosthetic, a bandage, or an eyepatch.

8. A device, comprising:
   one or more memories; and
   one or more processors, communicatively coupled to the one or more memories, configured to:
      select an individual that is a candidate for authentication by facial recognition;
      obtain a first temperature associated with a facial area of the individual;
      obtain a second temperature associated with a non-facial area of exposed skin of the individual;
      determine, based on a comparison of the first temperature and the second temperature, whether the first temperature is outside of a threshold difference in temperature range with respect to the second temperature;
      determine, based on determining whether the first temperature is outside of the threshold difference in temperature range with respect to the second temperature, whether an appearance of the facial area of the individual is likely altered by a face-altering technology,
         wherein the first temperature being within the threshold difference in temperature range with respect to the second temperature indicates that the appearance of the facial area of the individual is likely not altered by the face-altering technology,
         wherein the first temperature being outside of the threshold difference in temperature range with respect to the second temperature indicates that the appearance of the facial area of the individual is likely altered by the face-altering technology; and
      selectively perform facial recognition on the facial area of the individual based on whether the appearance of the facial area of the individual is likely altered by the face-altering technology.

9. The device of claim 8, wherein the one or more processors, when obtaining the first temperature and determining whether the first temperature is outside of the threshold difference in temperature range with respect to the second temperature, are further configured to:
obtain the first temperature and determine whether the first temperature is outside of the threshold difference in temperature range with respect to the second temperature before the individual is within a threshold distance from a transaction device.

10. The device of claim 8, wherein the one or more processors are further configured to:
determine that the appearance of the facial area of the individual is likely not altered by the face-altering technology; and
perform authentication of the individual using facial recognition.

11. The device of claim 8, wherein the one or more processors are further configured to:
determine that the appearance of the facial area of the individual is likely altered by the face-altering technology; and
perform authentication of the individual using a technique that does not include facial recognition.

12. The device of claim 8, wherein the one or more processors are further configured to:
determine, using a machine learning model, an estimated level of moisture of the facial area;
obtain data identifying an actual level of moisture of the facial area; and
wherein the one or more processors, when determining whether the appearance of the facial area of the individual is likely altered by face-altering technology, are further configured to:
determine whether the appearance of the facial area of the individual is likely altered by face-altering technology based on a comparison of the level of moisture to the estimated level of moisture.

13. The device of claim 8, wherein the one or more processors are further configured to:
determine whether a recess associated with an eye of the individual satisfies a threshold value,
wherein the first temperature being within the threshold difference in temperature range with respect to the second temperature and the recess associated with the eye satisfying the threshold value indicates that the appearance of the facial area of the individual is likely not altered by the face-altering technology,
wherein the first temperature being outside of the threshold difference in temperature range with respect to the second temperature or the recess associated with the eye failing to satisfy the threshold value indicates that the appearance of the facial area of the individual is likely altered by the face-altering technology.

14. The device of claim 8, wherein the one or more processors are further configured to:
determine that the appearance of the facial area of the individual is likely altered by the face-altering technology;
request that the individual perform one or more facial expressions;
determine that the one or more facial expressions indicate that the appearance of the facial area of the individual is likely altered by the face-altering technology; and
determine that the individual is not to be authenticated according to facial recognition.

15. A non-transitory computer-readable medium storing instructions, the instructions comprising:
one or more instructions that, when executed by one or more processors, cause the one or more processors to:
select an individual that is a candidate for authentication by facial recognition;
identify, based on selecting the individual, a facial area of the individual and an area of exposed skin of the individual,
wherein the area of exposed skin of the individual is not associated with the facial area of the individual;
obtain a first temperature associated with the facial area of the individual and a second temperature associated with the area of exposed skin of the individual;
determine, based on a comparison of the first temperature and the second temperature, whether the first temperature is outside of a threshold difference in temperature range with respect to the second temperature;
determine, based on determining whether the first temperature is outside of the threshold difference in temperature range with respect to the second temperature, whether an appearance of the facial area of the individual is likely altered by a face-altering technology,
wherein the first temperature being within the threshold difference in temperature range with respect to the second temperature indicates that the appearance of the facial area of the individual is likely not altered by the face-altering technology,
wherein the first temperature being outside of the threshold difference in temperature range with respect to the second temperature indicates that the appearance of the facial area of the individual is likely altered by the face-altering technology; and
selectively perform facial recognition on the facial area of the individual based on whether the appearance of the facial area of the individual is likely altered by the face-altering technology.

16. The non-transitory computer-readable medium of claim 15, wherein the one or more instructions, that cause the one or more processors to select the individual that is the candidate for authentication by facial recognition, cause the one or more processors to:
select the individual that is the candidate for authentication by facial recognition based on a request by the individual to access an account.

17. The non-transitory computer-readable medium of claim 15, wherein the one or more instructions, when executed by the one or more processors, further cause the one or more processors to:
determine that the appearance of the facial area of the individual is likely not altered by the face-altering technology; and
perform authentication of the individual using facial recognition.

18. The non-transitory computer-readable medium of claim 15, wherein the one or more instructions, when executed by the one or more processors, further cause the one or more processors to:
determine that the appearance of the facial area of the individual is likely altered by the face-altering technology; and
perform authentication of the individual using a technique that does not include facial recognition.

19. The non-transitory computer-readable medium of claim 15, wherein the one or more instructions, that cause the one or more processors to identify the facial area of the individual and the area of exposed skin of the individual, cause the one or more processors to:

identify the facial area of the individual and the area of exposed skin of the individual using computer vision.

20. The non-transitory computer-readable medium of claim 15, wherein the one or more instructions, that cause the one or more processors to obtain the first temperature and the second temperature, cause the one or more processors to:

obtain the first temperature and the second temperature from an infrared sensor.

\* \* \* \* \*